(12) United States Patent
Azema et al.

(10) Patent No.: US 6,403,250 B1
(45) Date of Patent: Jun. 11, 2002

(54) PRESSURE SENSITIVE CURRENT BREAKER FOR A CELL

(75) Inventors: Tadamitsu Azema; Yoshinori Ishikawa; Yosuke Arimori, all of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/510,046

(22) Filed: Feb. 22, 2000

(30) Foreign Application Priority Data

Mar. 1, 1999 (JP) .......................................... 11-053011

(51) Int. Cl.[7] ................................................ H01M 2/12
(52) U.S. Cl. ......................... 429/53; 429/56; 200/512; 200/61.08
(58) Field of Search ............................ 200/83 R, 83 N, 200/83 B, 61.08; 429/53–56, 175, 178, 181

(56) References Cited

U.S. PATENT DOCUMENTS

| | | | |
|---|---|---|---|
| 4,943,497 A | 7/1990 | Oishi et al. | |
| 5,705,290 A | 1/1998 | Azema | |
| 5,853,912 A | 12/1998 | Naing et al. | |
| 6,258,477 B1 | * 7/2001 | Kashihara et al. | 429/53 |
| 6,274,264 B1 | * 8/2001 | Azema | 429/53 |
| 6,284,403 B1 | * 9/2001 | Tsurutani et al. | 429/53 |
| 6,303,246 B1 | * 10/2001 | Takada et al. | 429/58 |
| 6,322,921 B1 | * 11/2001 | Iwaizono et al. | 429/56 |

FOREIGN PATENT DOCUMENTS

JP  2000-251873  * 9/2000

* cited by examiner

Primary Examiner—P. Austin Bradley
Assistant Examiner—Lisa N Klaus
(74) Attorney, Agent, or Firm—Brinks Hofer Gilson & Lione (57) ABSTRACT

The invention provides a high-performance pressure sensitive current breaker for a cell that securely cuts off the current path inside the cell even when the pressure increase inside the cell is low, and suppresses the pressure increase inside. The pressure sensitive current breaker for a cell of this invention is configured such that an insulator to swell out toward a diaphragm portion is formed by the insert molding with part of a lead part exposed from an opening of a retaining member, a notching part is formed on part of the lead part to make the lead part easily ruptured, a current path between a generating element inside the cell and an external electrode is made through the lead part, and when a pressure inside the cell case rises over a specific value to displace the diaphragm upward, the diaphragm presses the insulator upward to rupture the lead part at the notching part, thereby cutting off the current path.

8 Claims, 5 Drawing Sheets

PRESSURE SENSITIVE CURRENT BREAKER FOR A CELL

BACKGROUND OF THE INVENTION

1. Field of the Invention

The present invention relates to a pressure sensitive current breaker for a cell, which is used for ensuring the safety when a pressure inside a cell case is increased.

2. Description of the Related Art

There has been widely employed a rechargeable lithium ion secondary cell in which an organic solvent system electrolyte is filled and sealed inside a cell case as a power supply for portable equipment, such as portable telephones and personal computers.

However, overcharging during recharging such a cell, or recharging with an excessive current against the specified current will produce abnormality in the cell to generate gas inside the cell case. Therefore, the generated gas raises the pressure and temperature inside the case, swells the case to finally create cracks, and effuses the internal electrolyte, which on some occasion has caused negative influence over the equipment incorporating the cell.

And, even if the abnormality does not reach that degree, to continue using the cell in such abnormality as mentioned above will promote to swell the cell, which leads to such a hazard that the cell case ruptures, and the cell with such abnormality created has to be discontinued in use.

Figure 8:
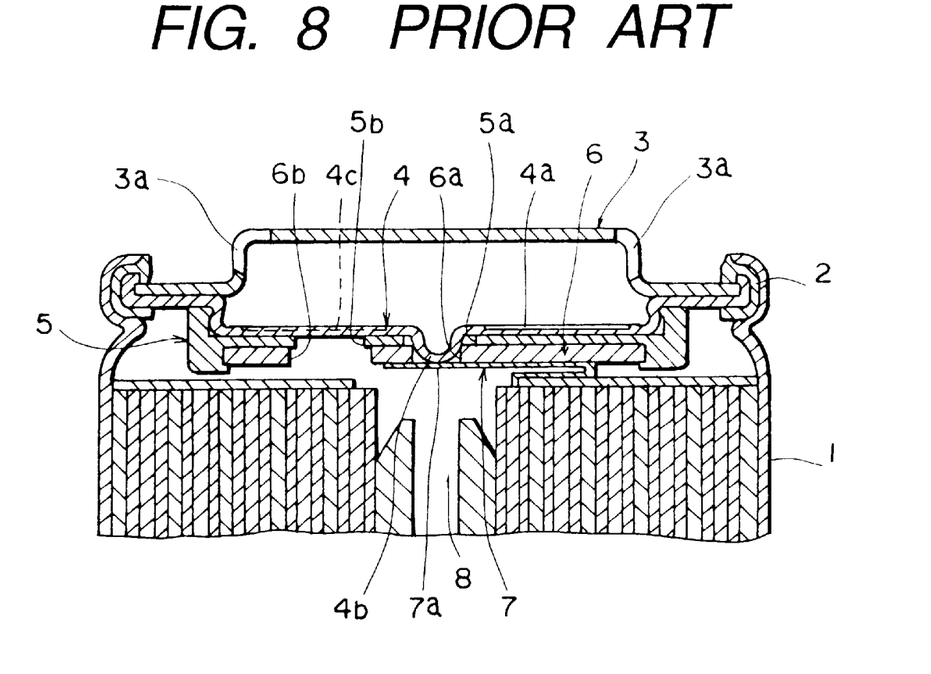
FIG. 8 is a sectional view of a major part, showing a conventional pressure sensitive current breaker for a cell.

A technique that removes such obstacles will be described with reference to FIG. 8, FIG. 9 which illustrate the conventional pressure sensitive current breaker that is used for a circular cell. The pressure sensitive current breaker includes a cell cover 3 attached to a cell case 1 through a gasket 2 by caulking the surrounding thereof so as to seal the inside of the cell case 1, and, under the cell cover 3, an actuator 4 capable of displacing upward.

The cell cover 3 has an air vent 3a formed thereon, and when the actuator 4 ruptures due to a pressure increase inside the cell case 1, the inner high pressure gas is made to run out through the air vent 3a.

And, the actuator 4 has an annular safety valve 4a formed by the drawing, etc. The annular safety valve 4a has a protrusion 4b projecting downward on the center of the actuator, and a radial groove 4c formed on the lower side thereof to surround the protrusion 4b. The actuator 4 is made thin in the area where this groove 4c is formed, whereby the actuator 4 can be ruptured by the pressure increase inside the cell case 1.

And, an insulating plate 5 is provided underneath the actuator 4. The insulating plate 5 has a hole 5a through which the protrusion 4b of the safety valve 4a is inserted, and additionally a vent hole 5b formed.

A lead fixing member 6 is provided to underlie the insulating plate 5. The lead fixing member 6 is provided with a hole 6a communicating with the hole 5a of the insulating plate 5, and a vent hole 6b communicating with the vent hole 5b of the insulating plate 5.

Through the holes 5a, 6a of the insulating plate 5 and the lead fixing member 6 is inserted the protrusion 4b of the safety valve 4a, and on the front of the protrusion 4b is attached a thin lead 7 made of a metal plate.

This thin lead 7 has a junction portion 7a welded by the spot welding or the like on the front of the protrusion 4b, whereby the actuator 4 is electrically made conductive with the lead 7. And, the other end of the lead 7 is connected to a generating element 8 illustrated on the lower part in the drawing, and a current path is configured across the generating element 8 and the cell cover 3.

Figure 9:
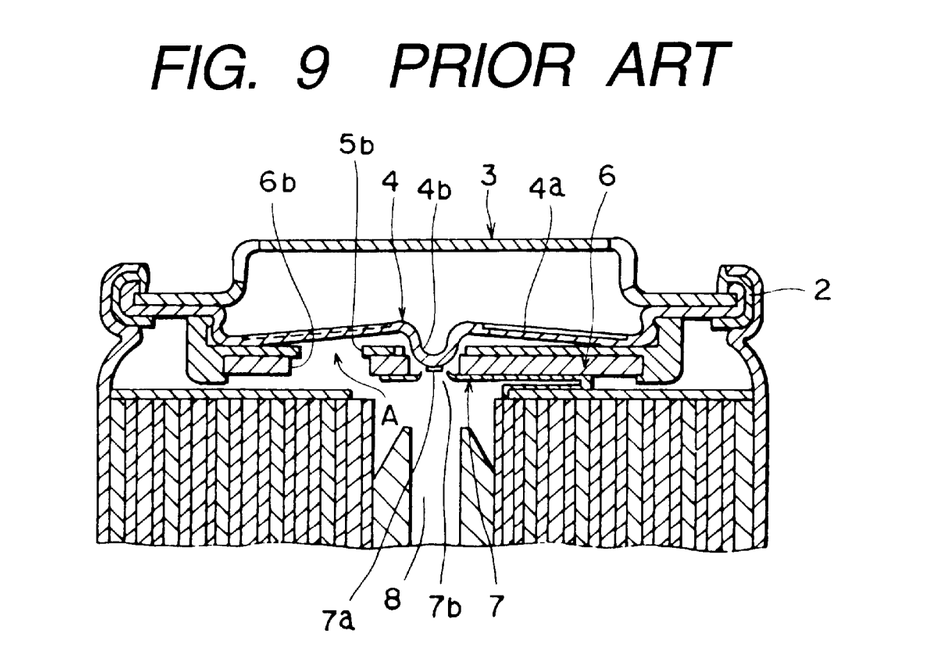
FIG. 9 is a sectional view of the major part, which explains the conventional pressure sensitive current breaker for a cell.

When the pressure inside the cell case 1 is raised by an abnormality of the cell, the pressure increased gas is flown into the vent holes 5b, 6b, as in the arrow A shown in FIG. 9, which produces a force to push up the rear side of the safety valve 4a.

This force displaces the safety valve 4a upward, and exerts a concentrated stress on the junction portion 7a of the lead 7. This concentrated stress breaks the junction portion 7a to cut off the electric connection between the lead 7 and the actuator 4, thus disconnecting the current path of the cell.

This current path disconnection cuts off the flow of currents inside the cell, so that the pressure increase inside the cell case 1 can be restricted. If the cutoff of the current path does not suppress the pressure increase inside the cell and the inner pressure is further increased, the further increased inner pressure of the cell is exerted on the radial groove 4c formed on the safety valve 4a, the actuator 4 formed thin by the groove 4c is ruptured. Therefore the pressure increased gas runs out through the air vent 3a, thus preventing the blowout of the cell.

Portable equipment such as portable telephones using this type of a conventional cell has advanced miniaturization, and along with this, there has been an increased demand for the miniaturization of a cell used in such portable equipment.

However, in the conventional pressure sensitive current breaker for a cell, the size of the actuator 4 has to be made as large as the actuator 4 can operate without a difficulty, even when the pressure increase inside the cell is low. Therefore, it is difficult to miniaturize the conventional pressure sensitive current breaker, and it has been difficult to miniaturize the cell.

Further, when the lead 7 is ruptured by the pressure increase inside the cell, the junction portion 7a is drawn and stretched by the actuator 4 and broken as it is torn, since the lead 7 is formed by a thin plate.

Accordingly, long burrs like beards are produced on the ruptured face of the junction portion 7a after the rupture, and on the ruptured face of a ruptured hole 7b made after the rupture of the junction portion 7a. Because of the burrs, there has been a possibility that the current path between the actuator 4 displaced up and the lead 7 is not completely cut off.

The present invention has been made in view of the foregoing circumstances, and provides a high-performance pressure sensitive current breaker for a cell that allows the miniaturization and reliably cuts off the current path even when a pressure increase inside the cell is low.

SUMMARY OF THE INVENTION

In order to accomplish the foregoing object, the pressure sensitive current breaker for a cell according to one aspect of the invention includes a cell case containing a generating element inside thereof, a cell cover that hermetically seals the cell case, a diaphragm portion formed on the cell cover to expand inward inside the cell case, an external electrode having a terminal part connected to the generating element and exposed outside and a lead part that is easy to break, and an insulating retaining member that embeds the external electrode therein and has an opening to expose the lead part. In the pressure sensitive current breaker thus constructed, the lead part is placed overlying the diaphragm portion to face each other, the lead part located in the opening is formed integrally with an insulator to swell out toward the diaphragm portion, a current path between the generating element and the terminal part of the external electrode is made through the lead part, and when a pressure inside the cell case rises over a specific value, the insulator is pressed by a displacement of the diaphragm portion, and thereby the lead part is ruptured and the current path is cut off.

According to another aspect of the invention, the pressure sensitive current breaker is configured such that the terminal part and the lead part are integrally formed in the external electrode.

According to another aspect of the invention, the pressure sensitive current breaker is configured such that the lead part is embedded into the insulator to be integrated.

According to another aspect of the invention, the pressure sensitive current breaker is configured such that the retaining member is provided with a coupling part to couple the insulator, and the insulator and the retaining member are separated by cutting the coupling part.

According to another aspect of the invention, the pressure sensitive current breaker is configured such that the lead part has parts that extend from both ends of the insulator exposed in the opening, and a notching part formed which thins a wall-thickness of either of the exposed parts.

According to another aspect of the invention, the pressure sensitive current breaker is configured such that the width of the lead part at a part where the notching part is formed is made narrower by another cut.

According to another aspect of the invention, the pressure sensitive current breaker is configured such that when an internal stress that displaces the insulator upward is exerted on the lead part on the far side viewing the insulator from the part where the notching part exposed in the opening is formed and the lead part is broken off at the notching part, the parts where the lead part has been ruptured are significantly separated from each other.

According to another aspect of the invention, the pressure sensitive current breaker is configured such that the insulator has a swollen face expanding toward the diaphragm portion formed in a circular arc, and a projection formed on the swollen face near an edge of the insulator, which is located at the far side from the notching part, and when the diaphragm portion is displaced to break the lead part, the projection is pressed by the diaphragm portion.

DETAILED DESCRIPTION OF THE PREFERRED EMBODIMENT

Figure 1:
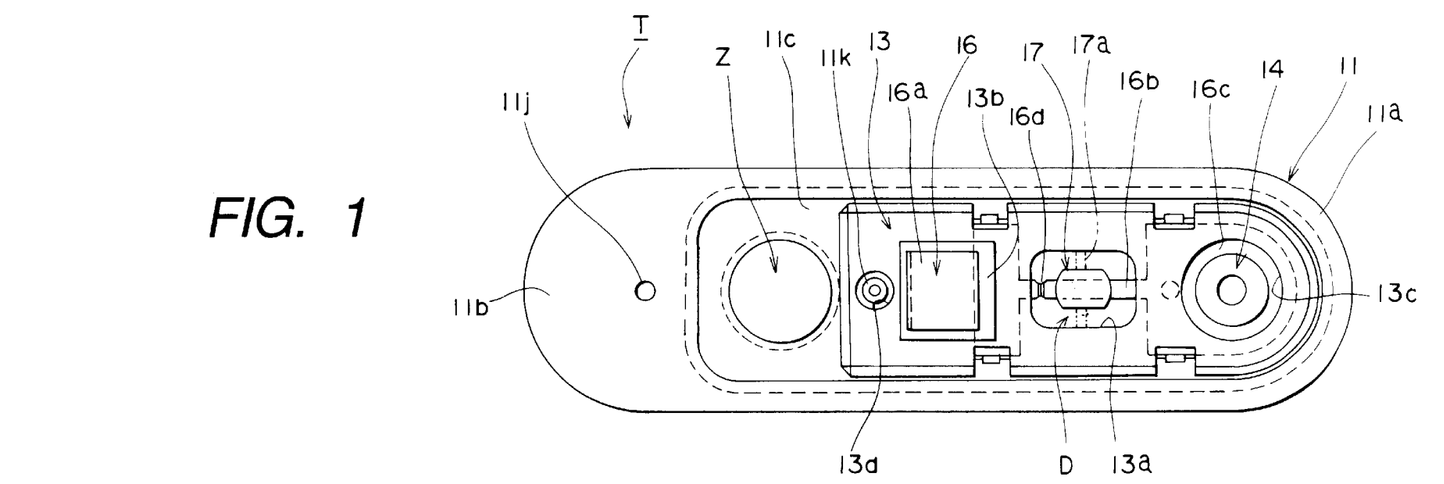
FIG. 1 is a top view of a pressure sensitive current breaker for a cell of the present invention.
Figure 2:
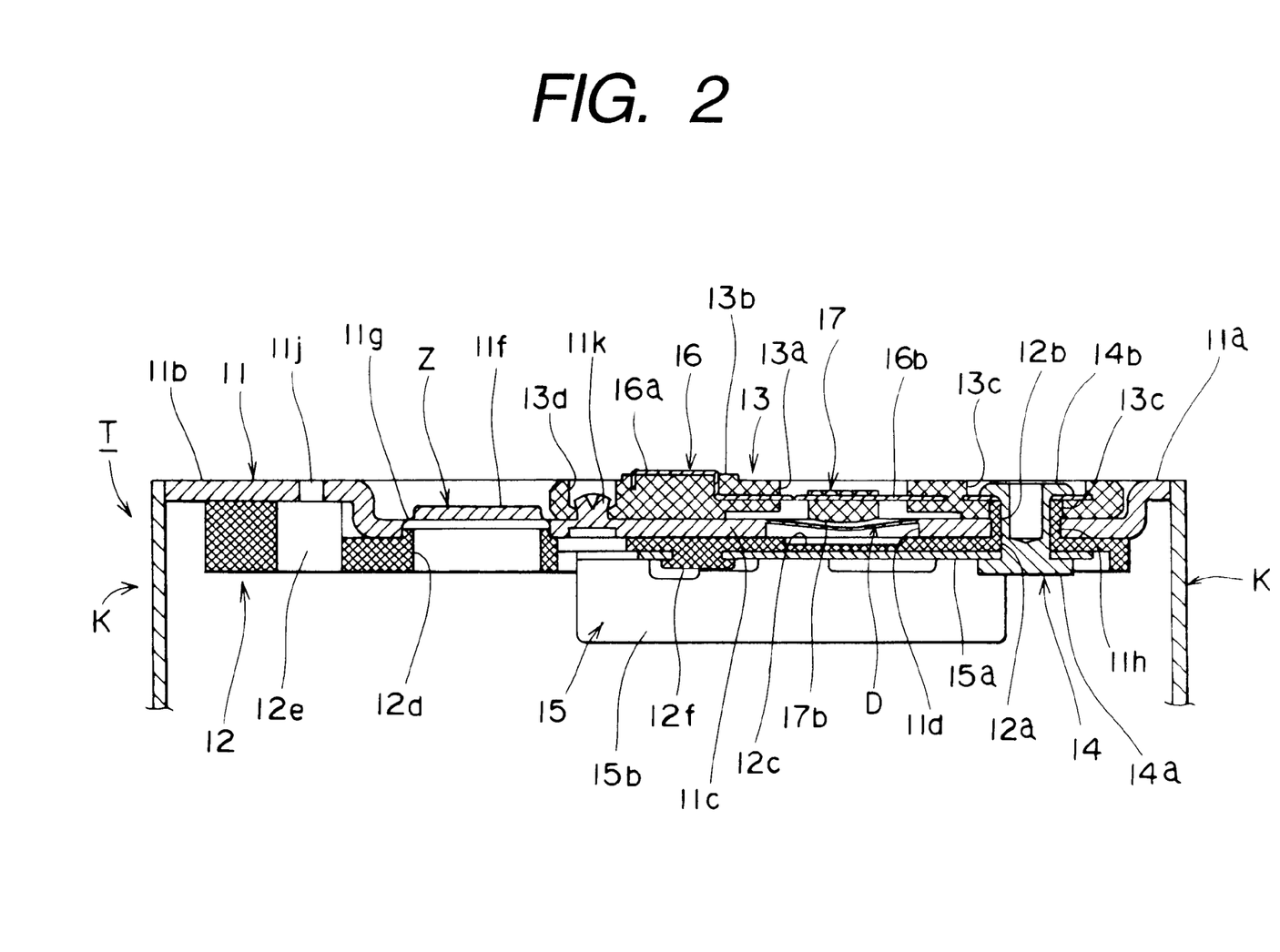
FIG. 2 is a sectional view in which the pressure sensitive current breaker is installed on a cell case.
Figure 3:
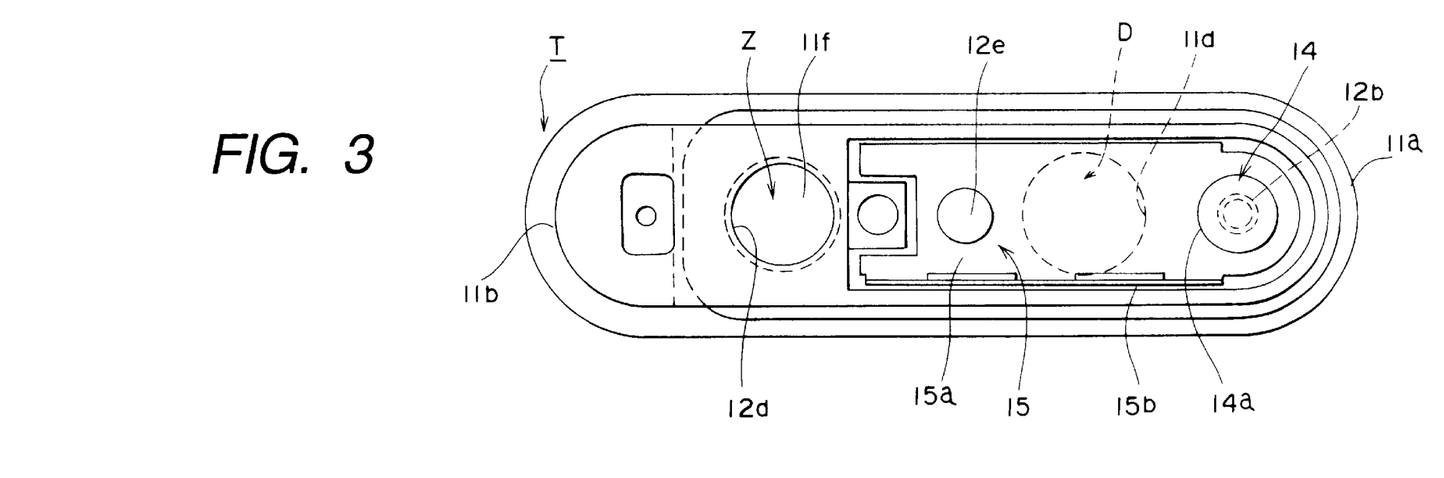
FIG. 3 is a bottom view of the pressure sensitive current breaker relating to the present invention.
Figure 4:
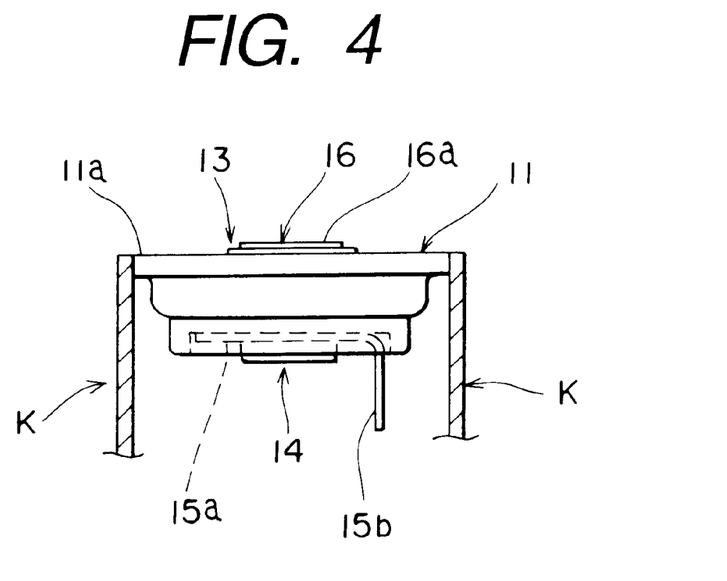
FIG. 4 is a sectional side view of a major part of the pressure sensitive current breaker relating to the present invention.
Figure 5:
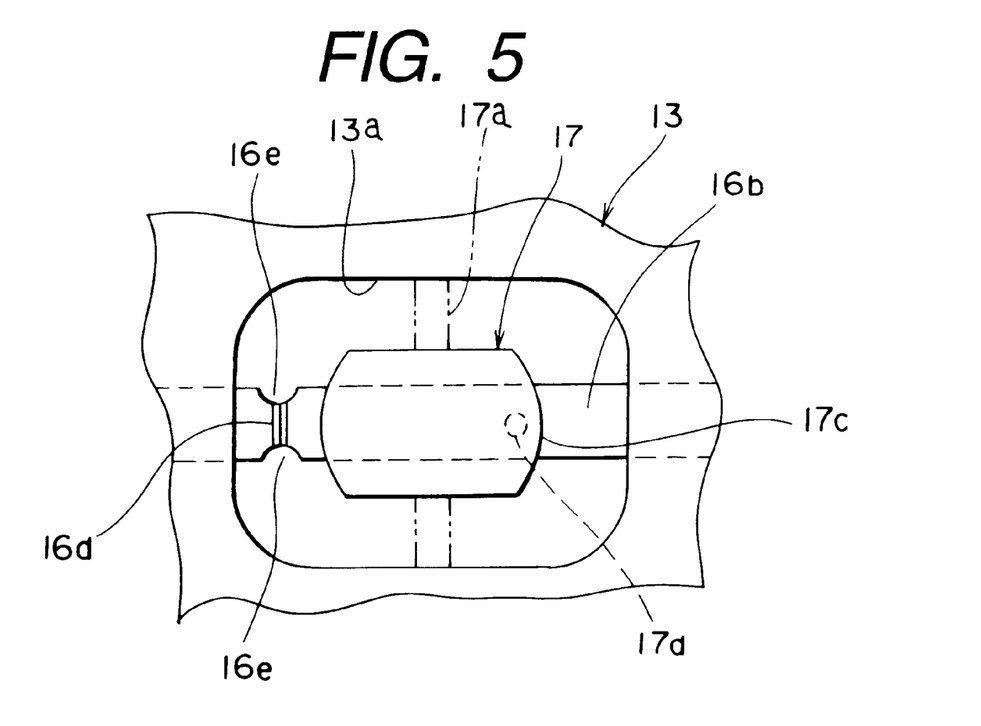
FIG. 5 is an enlarged sectional view of a major part of the pressure sensitive current breaker relating to the present invention.
Figure 6:
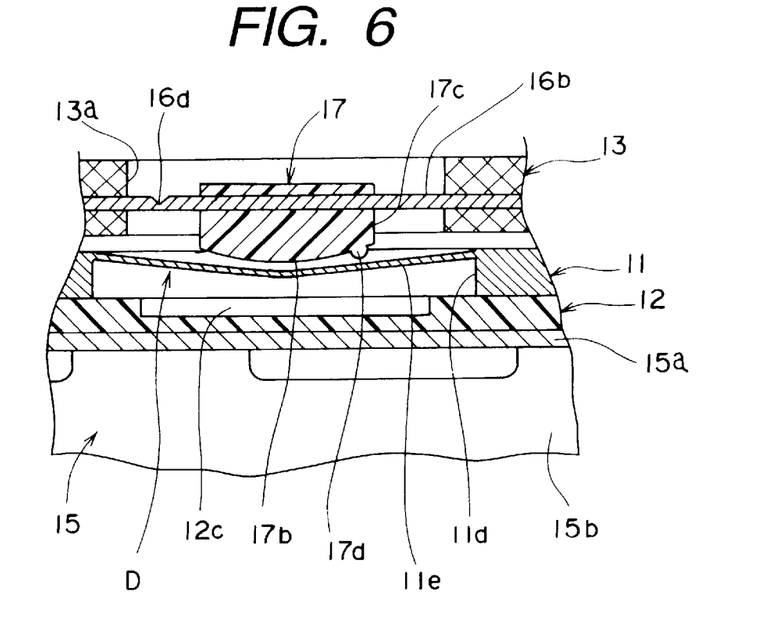
FIG. 6 is an enlarged sectional view of a major part relating to the present invention.
Figure 7:
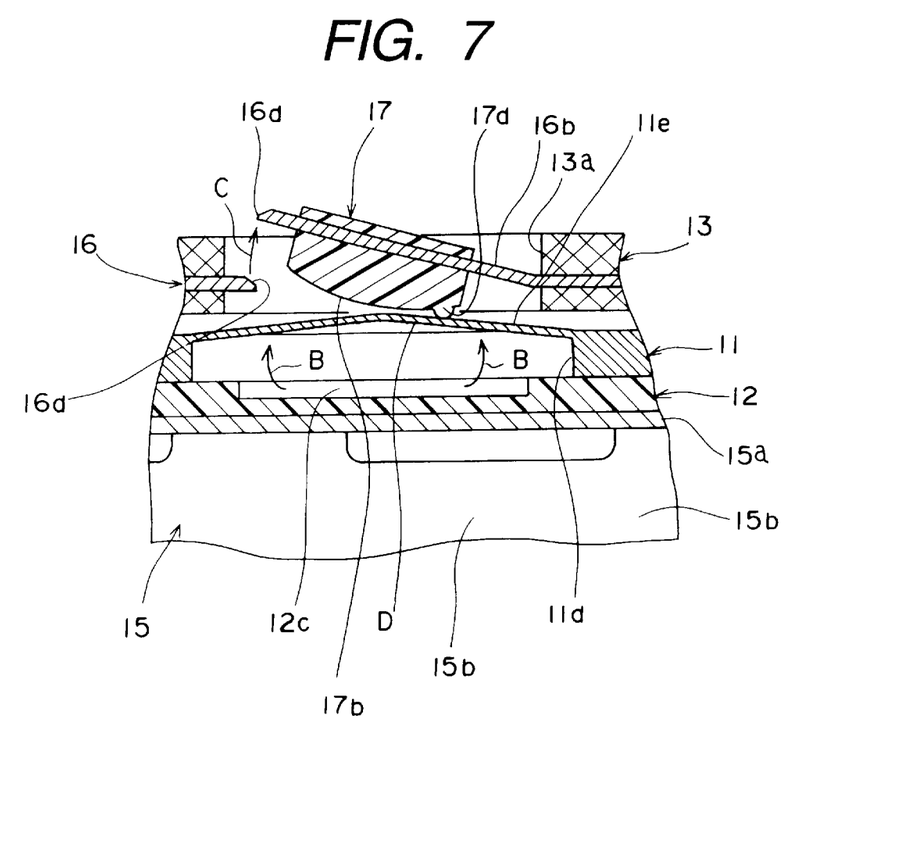
FIG. 7 is an enlarged sectional view of a major part, which explains the operation of the pressure sensitive current breaker for a cell of the present invention.

The preferred embodiment of a pressure sensitive current breaker for a cell of the present invention will be described with reference to the accompanying drawings. First, FIG. 1 is a top of the view pressure sensitive current breaker of the present invention, FIG. 2 a sectional view in which the pressure sensitive current breaker is installed on a cell case, FIG. 3 is a bottom view relating to the present invention, FIG. 4 is a sectional side view of a major part relating to the present invention, FIG. 5 is an enlarged plan view of a major part relating to the present invention, FIG. 6 is an enlarged sectional view of a major part relating to the present invention, FIG. 7 is an enlarged sectional view of a major part, which explains the operation relating to the present invention.

A pressure sensitive current breaker T of the present invention will be described with a case in which it is applied to, for example, a rectangular cell as shown in FIG. 1 through FIG. 4. A generating element (not illustrated) is contained in a cell case K, and the inside thereof is sealed airtight by a cell cover 11, which is fastened to the cell case K by welding, etc.

The cell cover 11 is put between a fastening member 12 attached thereunder and a retaining member 13 attached thereon, and the cell cover 11, fastening member 12, and retaining member 13 are integrally assembled by using a rivet 14 placed on the right side of the drawing.

The caulking of the rivet 14 makes electrically conductive of an internal electrode 15 underlying the fastening member 12 and an external electrode 16 integrally formed into the retaining member 13. Thereby, a current path is formed between the generating element inside the cell and the external electrode 16, whereby the outline of the pressure sensitive current breaker of this invention is configured.

The cell cover 11 is made of a conductive metal plate such as an aluminum, which is formed in an elliptic shape as shown in FIG. 1 through FIG. 4. This elliptic cell cover 11 has a belt-form flange 11a on the periphery thereof and a wide flattened flange 11b on the left side of the drawing, and the inside of the flanges 11a, 11b is extruded downward by drawing or the like, thus forming a flattened bottom 11c.

On parts of the bottom 11c are formed a diaphragm portion D on the right and a safety valve portion Z on the left.

The diaphragm portion D is provided with a thin-wall part 11e, which is formed, for example, by grinding the lower side of the bottom 11c from thereunder into an annular recess 11d.

This thin-wall part 11e is formed swollen downward by pressing down the cell case K in a dish-shape. This type of the diaphragm portion D is displaceable according to the pressure variation inside the cell case K, and the center of the thin-wall part 11e can be displaced up and down serving the base on the periphery thereof as the fulcrum.

And, the safety valve portion Z is made up with a flattened thick-wall projection 11f extruded upward in an annular shape, and a thin-wall connection 11g that is formed to thin the base of the thick-wall projection 11f.

A hole 11h that enables a cylindrical part 12b of the fastening member 12 described later to be inserted is formed near the right side of the bottom 11c. A filler hole 11j for filling the electrolyte, etc., inside the cell case K is formed on the flattened flange 11b on the left side of the drawing.

A caulking 11k formed by extruding the bottom 11c upward is provided near the right side of the safety valve portion Z, which makes the retaining member 13 described later detachable.

Under the bottom 11c of the cell cover 11 is placed the fastening member 12 made of a substantially elliptic insulating material smaller than the shape of the cell cover 11. The cylindrical part 12b with a rivet hole 12a for inserting the rivet 14 described later is formed to extrude upward on the fastening member 12, near the right end shown in FIG. 2.

The fastening member 12 is provided with a ventilation groove 12c formed in a specific width and depth on an area where the diaphragm portion D is formed and the recess 11d is placed. Thereby, the pressure variation inside the cell case K is transmitted to the diaphragm portion D through the ventilation groove 12c.

On the fastening member 12 where the safety valve portion Z is located, an air vent 12d of the substantially same size as the diameter of the safety valve portion Z is formed through; and on the fastening member 12 where the filler hole 11j is located, an inlet 12e larger than the filler hole 11j is formed through.

A caulking 12f is formed to project downward on the center of the fastening member 12.

On the bottom 11c of the cell cover 11 except the safety valve portion Z is attached the retaining member 13, into which the external electrode 16 described later is integrated by the insert molding.

This retaining member 13 is made of an insulating material, in which a rectangular opening 13a is formed to overlie the diaphragm portion D, and a substantially rectangular terminal holder 13b is formed on the left of the opening 13a near the center of the cell cover 11.

Close to the right end of the retaining member 13, a circular rivet caulking 13c for caulking the rivet 14 described later is formed to be engraved in a specific depth.

On the left of the terminal holder 13b, a caulking hole 13d for caulking the caulking 11k of the cell cover 11 is formed in a specific depth.

Through the rivet hole 12a of the fastening member 12, the rivet 14 made of a metal rod such as a copper is inserted so as to be caulked. The rivet 14 has a head 14a formed on the lower part thereof and a tip 14b ejecting from the cylindrical part 12b formed on the upper part thereof.

And, the rivet 14 is inserted through the rivet hole 12a of the fastening member 12, and a fitting part 15a of the internal electrode 15 is sandwiched between the head 14a of the rivet 14 and the fastening member 12.

The internal electrode 15 is made of a metal plate such as a copper, in which are formed the flattened fitting part 15a that borders on the bottom of the fastening member 12 and a terminal part 15b that is bent down in a substantially L-letter form from the fitting part 15a.

And, one end of the fitting part 15a on the left in the drawing is caulked by the caulking 12f of the fastening member 12, and the other end thereof on the right in the drawing is held between the head 14a of the rivet 14 and the fastening member 12, whereby the internal electrode 15 is fastened to the fastening member 12.

The external electrode 16 integrally embedded by the insert molding or the like into the retaining member 13 overlying the bottom 11c of the cell cover 11 is made of a sheet of metal plate such as a nickel. As shown in FIG. 1, the external electrode 16 is made up with a terminal part 16a, lead part 16b, and rivet connecting part 16c, which are formed into an integral structure.

The external electrode 16 is connected to the generating element (not illustrated) inside the cell through the rivet 14, and the exposed terminal part 16a is fit into the terminal holder 13b by the insert molding.

And, in the external electrode 16 formed into the terminal holder 13b, the lead part 16b is disposed to face the diaphragm portion D, and exposed in the opening 13a. On the center of this lead part 16b is attached an insulator 17 described later, and the rivet connecting part 16c is inserted into the retaining member 13 to be exposed from the bottom of the rivet caulking 13c.

Further, the cylindrical part 12b of the fastening member 12 is inserted in the hole 11h of the cell cover 11 near the right end thereof, and the rivet 14 is inserted in the rivet hole 12a, and the tip 14b is caulked; and thereby, the head 14a is made conductive with the fitting part 15a of the internal electrode 15, the tip 14b is made conductive with the rivet connecting part 16c, and the internal electrode 15 and the external electrode 16 are electrically connected though the rivet 14.

And, if the terminal part 15b of the internal electrode 15 is connected to the generating element (not illustrated) inside the cell, a current path will be formed between the generating element and the terminal part 16a of the external electrode 16.

And, as shown in FIG. 5, FIG. 6, in the lead part 16b of the external electrode 16 exposed in the opening 13a, the parts extending from both the right and left ends of the insulator 17 are exposed in the opening 13a.

The lead part 16b has a V-shaped cut 16d formed by press working or the like, to thin the wall thickness of either of the exposed parts in the opening 13a.

Further, the lead part 16b has a U-shaped cut 16e formed to thin the width of the part where the V-shaped cut 16d is formed. Accordingly, the lead part 16b is made easy to be broken by the V-shaped cut 16d and the U-shaped cut 16e.

An internal stress (not illustrated) such that the insulator 17 can be displaced upward is exerted in anticipation on the lead part 16b on the far side viewing the insulator 17 from the part where the V-shaped cut 16d exposed in the opening 13a is formed. If the lead part 16b is broken off at the V-shaped cut 16d, the very parts where the lead part 16b has been ruptured will significantly be separated each other.

The insulator 17 on the center of the lead part 16b exposed in the opening 13a of the retaining member 13 is formed so as to project on the side of the diaphragm portion D. This insulator 17 embeds the lead part 16b, whereby the insulator 17 and the lead part 16b are integrated. A coupling part 17a made of a gate to couple the insulator 17 as shown by the two-dot chain line in FIG. 5 is formed onto the opening 13a of the retaining member 13.

When the retaining member 13 is molded, the softened compound poured in on the side of the retaining member 13 in the forming die (not illustrated) is flown from the coupling part 17a toward the insulator 17, and the lead part 16b is embedded into the insulator 17, so that the retaining member 13 and the insulator 17 can simultaneously be molded.

The coupling part 17a is cut off after molding, and it is separated from the retaining member 13 and the insulator 17.

Also, as shown in FIG. 6, the insulator 17 has a swollen face 17b expanding toward the underlying diaphragm portion D formed in a circular arc. And, a projection 17d is formed on the swollen face 17b near an edge 17c of the insulator 17, which is located at the far side from the V-shaped cut 16d. The height of the projection 17d is equal to or lower than the height of the swollen face 17b at its center.

The pressure sensitive current breaker T for a cell provided with such a construction, as shown in FIG. 2, is assembled as follows: to align the cell cover 11 to the opening part of the cell case K that contains the generating elements not illustrated), etc., to fix the periphery of the flanges 11a, 11b of the cell cover 11 to the cell case K by welding, etc., thereafter, to pour a specified electrolyte (not illustrated) from the filler hole 11j, and to seal the filler hole 11j by welding etc.; and thereby, the inside of the cell case K is hermetically sealed to complete the assembly of the cell (not illustrated).

The operation of the pressure sensitive current breaker T for a cell is as follows. When abnormality is created inside the cell case K to raise the pressure inside the cell, as shown in FIG. 7, the gas with an increased pressure enters into the recess 11d of the diaphragm portion D as the arrow B, effecting to generate a force that pushes up the thin-wall part 11e of the diaphragm portion D. If the increased pressure inside the cell exceeds a specific value, this pressure will push up the diaphragm portion D to invert it up at a stroke.

This inversion of the diaphragm portion D presses the swollen face 17b of the insulator 17 near the center of the diaphragm portion D, so that the lead part 16b which is easy to break can be cut off from the V-shaped cut 16d. And, after the lead part 16b is cut off, the insulator 17 on the side of the V-shaped cut 16d is pushed up in the direction of the arrow C high enough to be separated from the retaining member 13.

When the lead part 16b is ruptured, as shown in FIG. 7, the projection 17d is pressed by the diaphragm portion D to push up the insulator 17, and the internal stress exerted on the lead part 16b on the opposite side of the V-shaped cut 16d is able to significantly separate the lead part 16b on the side of the insulator 17 from the lead part 16b on the side of the retaining member 13.

Accordingly, the current path between the external electrode 16 and the generating element inside the cell case K can securely be cut off.

The cutoff of the current path will suppress the pressure increase inside the cell case K to prevent a blowout of the cell.

Although the current path between the external electrode 16 and the generating element (not illustrated) inside the cell case K is cut off if the pressure inside the cell is not saturated to continue increasing, the still increasing pressure inside the cell will act on the thick-wall projection 11f of the safety valve portion Z to rupture the thin-wall connection 11g.

This rupture of the thin-wall connection 11g will eject the gas with the increased pressure inside the cell to prevent a blowout of the cell.

In the embodiment of this invention, the retaining member 13 and the insulator 17 are simultaneously formed, however the insulator 17 may be formed to project by using an insulating adhesive, etc.

In the pressure sensitive current breaker for a cell of this invention, the lead part is placed to face the diaphragm portion, the insulator swelling out toward the diaphragm portion is formed integrally with the lead part located in the opening, the current path is formed between the generating element inside the cell and the terminal part of the external electrode, and when the pressure inside the cell case is raised over a specific value, the displacement of the diaphragm presses the insulator, beaks the lead part, and cuts off the current path. As the result, it becomes unnecessary to weld another member to the diaphragm portion, which makes unnecessary the facilities such as a resistance welder, etc., and simplifying the assembly.

Further, if the pressure increase inside the cell is low, this low internal pressure will accurately displace the diaphragm portion upward, whereby the current path between the generating element inside the cell and the external electrode can be cut off securely.

Further, since the external electrode has the terminal part and the lead part integrally formed, the structure becomes simplified to facilitate the manufacturing of the pressure sensitive current breaker for a cell.

Further, since the lead part is embedded into the insulator to be incorporated therein, the insulator is securely fastened to the lead part, and the pressure effected by the upward dislocation of the diaphragm portion by the pressure increase inside the cell is securely transmitted to the lead part through the insulator, the pressure sensitive current breaker for a cell with a high accuracy can be achieved.

Further, since the retaining member is provided with the coupling part that couples the insulator to the retaining member, and the insulator and the retaining member are designed to be separated by cutting this coupling part, the insulator is simultaneously formed through the coupling part during forming the retaining member, which facilitates the manufacturing of the pressure sensitive current breaker for a cell.

Further, since the parts of the lead part extending from both ends of the insulator are exposed in the opening, and the V-shaped cut that thins the wall thickness of either of the exposed parts is formed thereon, even if the pressure increase inside the cell is low, the lead part will become easy to be broken by the V-shaped cut, and a small diaphragm portion will securely break the lead part, thus achieving the pressure sensitive current breaker for a cell.

Further, since the width of the lead part at the part where the V-shaped cut is formed is made narrower by another cut, the lead part can be ruptured still more securely, thus achieving the pressure sensitive current breaker for a cell.

Further, when the internal s tress such that the insulator can be displaced upward is exerted on the lead part on the far side viewing the insulator from the part where the V-shaped cut exposed in the opening is formed, and the lead part is ruptured at the v-shaped cut, the very parts where the lead part has been broken off are made to be significantly separate d each other; and therefore, even if the diaphragm portion goes down again after the rupture of the lead part, the internal stress will maintain the position where the lead part with the insulator attached is displaced upward, and the ruptured parts of the lead part will not be made conductive again.

Furthermore, the insulator has a swollen face expanding toward the underlying diaphragm portion formed in a circular arc, and the projection formed on the swollen face near an edge of the insulator, which is located at the far side from the V-shaped cut, and When the diaphragm portion is displaced to break the lead part, the projection is made to be pressed by the diaphragm portion; and therefore, even if the stroke of the diaphragm is small, the projection will be able to significantly separate the lead parts where the rupture has occurred, and a small diaphragm will securely cut off the current path. Thus, the pressure sensitive current breaker for a small-sized cell can be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pressure sensitive current breaker for a cell, comprising a cell case containing a generating element inside thereof, a cell cover that hermetically seals the cell case, a diaphragm portion formed on the cell cover to expand inward inside the cell case, an external electrode having a terminal part connected to the generating element and exposed outside and a lead part that is easy to break, and an insulating retaining member that embeds the external electrode therein and has an opening to expose the lead part, wherein the lead part is placed overlying the diaphragm portion to face each other, the lead part located in the opening is formed integrally with an insulator to swell out toward the diaphragm portion, a current path between the generating element and the terminal part of the external electrode is made through the lead part, and when a pressure inside the cell case rises over a specific value, the insulator is pressed by a displacement of the diaphragm portion, whereby the lead part is ruptured and the current path is cut off.

2. The pressure sensitive current breaker for a cell according to claim 1, wherein the terminal part and the lead part are integrally formed in the external electrode.

3. The pressure sensitive current breaker for a cell according to claim 1, wherein the lead part is embedded into the insulator to be integrated.

4. The pressure sensitive current breaker for a cell according to claim 1, wherein the retaining member is provided with a coupling part to couple the insulator, and the insulator and the retaining member are separated :by cutting the coupling part.

5. The pressure sensitive current breaker for a cell according to claim 1, wherein the lead part has parts that extend from both ends of the insulator exposed in the opening, and a notching part formed which thins a wall-thickness of either of the exposed parts.

6. The pressure sensitive current breaker for a cell according to claim 5, wherein the width of the lead part at a part where the notching part is formed is made narrower by another cut.

7. The pressure sensitive current breaker for a cell according to claim 5, wherein, when an internal stress that displaces the insulator upward is exerted on the lead part on the far side viewing the insulator from the part where the notching part exposed in the opening is formed and the lead part is broken off at the notching part, the parts where the lead part has been ruptured are significantly separated from each other.

8. The pressure sensitive current breaker for a cell according to claim 5, wherein the insulator has a swollen face expanding toward the diaphragm portion formed in a circular arc, and a projection formed on the swollen face near an edge of the insulator, which is located at the far side from the notching part, and when the diaphragm portion is displaced to break the lead part, the projection is pressed by the diaphragm portion.

* * * * *

UNITED STATES PATENT AND TRADEMARK OFFICE
CERTIFICATE OF CORRECTION

PATENT NO. : 6,403,250 B1
DATED : June 11, 2002
INVENTOR(S) : Tadamitsu Azema et al.

It is certified that error appears in the above-identified patent and that said Letters Patent is hereby corrected as shown below:

<u>Column 10,</u>
Line 7, delete ":by" and substitute -- by --

Signed and Sealed this

Twenty-fifth Day of March, 2003

JAMES E. ROGAN
*Director of the United States Patent and Trademark Office*